United States Patent
Liu et al.

(10) Patent No.: US 10,812,794 B2
(45) Date of Patent: *Oct. 20, 2020

(54) METHOD AND APPARATUS OF INTRA PREDICTION IN IMAGE AND VIDEO PROCESSING

(71) Applicant: MEDIATEK INC., Hsinchu (TW)

(72) Inventors: Shan Liu, San Jose, CA (US); Xiaozhong Xu, State College, PA (US); Jing Ye, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,759

(22) Filed: Sep. 3, 2019

(65) Prior Publication Data
US 2019/0394461 A1    Dec. 26, 2019

Related U.S. Application Data

(63) Continuation of application No. 15/460,558, filed on Mar. 16, 2017, now Pat. No. 10,448,011.

(60) Provisional application No. 62/394,283, filed on Sep. 14, 2016, provisional application No. 62/309,991, filed on Mar. 18, 2016.

(51) Int. Cl.
| | |
|---|---|
| *H04N 19/107* | (2014.01) |
| *H04N 19/11* | (2014.01) |
| *H04N 19/463* | (2014.01) |
| *H04N 19/157* | (2014.01) |
| *H04N 19/159* | (2014.01) |
| *H04N 19/46* | (2014.01) |
| *H04N 19/172* | (2014.01) |
| *H04N 19/176* | (2014.01) |

(52) U.S. Cl.
CPC .......... *H04N 19/107* (2014.11); *H04N 19/11* (2014.11); *H04N 19/157* (2014.11); *H04N 19/159* (2014.11); *H04N 19/46* (2014.11); *H04N 19/463* (2014.11); *H04N 19/172* (2014.11); *H04N 19/176* (2014.11)

(58) Field of Classification Search
CPC .... H04N 19/107; H04N 19/159; H04N 19/46; H04N 19/176; H04N 19/172
USPC ..................................... 375/240.12
See application file for complete search history.

(56) References Cited

U.S. PATENT DOCUMENTS

2012/0307894 A1*  12/2012  Chien ............... H04N 19/176
                                                                    375/240.12

* cited by examiner

*Primary Examiner* — Nam D Pham
(74) *Attorney, Agent, or Firm* — McClure, Qualey & Rodack, LLP

(57) ABSTRACT

A method processes video data by intra prediction in a video coding system. In one implementation, the method receives input data associated with a current block in a current picture, wherein the current block is a non-square block and is coded or to be coded by intra prediction. The method then determines a first set of angular intra prediction modes for the longer side of the current block, wherein a number of the first set of the angular intra prediction modes is greater than a number of a second set of angular intra prediction modes for the shorter side of the current block. The method then determines a current intra prediction mode to derive an intra predictor for the current block, and encodes or decoding the current block according to the current intra prediction mode.

12 Claims, 9 Drawing Sheets

METHOD AND APPARATUS OF INTRA PREDICTION IN IMAGE AND VIDEO PROCESSING

CROSS REFERENCE TO RELATED APPLICATIONS

The present invention is a Continuation of U.S. Utility application Ser. No. 15/460,558, filed on Mar. 16, 2017, now U.S. Pat. No. 10,448,011, which claims priority to U.S. Provisional Patent Application, Ser. No. 62/309,991, filed on Mar. 18, 2016, entitled "Methods for intra prediction in image and video compression", and U.S. Provisional Patent Application, Ser. No. 62/394,283, filed on Sep. 14, 2016, entitled "Methods for intra picture prediction in image and video compression". The U.S. Provisional Patent Applications are hereby incorporated by reference in their entireties.

FIELD OF THE INVENTION

The present invention relates to intra prediction in image and video processing. In particular, the present invention relates to encoding and decoding image or video data with adaptive intra prediction mode set.

BACKGROUND AND RELATED ART

Intra prediction has been widely adopted in various image and video coding standard to process an initial picture or to periodically insert I-picture or I-blocks for random access or for alleviation of error propagation. Intra prediction is usually designed to exploit spatial features in the picture such as smooth area, vertical line or edge, horizontal line or edge, and diagonal line or edge. Intra prediction is also useful for regions with high motion or scene changes. Intra prediction exploits the spatial correlation within a picture or within a picture region. For a block-based video coding standard, intra prediction for a current block is relied upon pixels in neighboring blocks that have been processed. For example, if blocks in a picture or picture region are sequentially processed row by row from top to bottom and from left to right, neighboring blocks on the top and neighboring blocks on the left of the current block can be used to form an intra predictor for pixels in the current block.

The High-Efficiency Video Coding (HEVC) standard supports 35 intra prediction modes including 33 angular modes, DC mode and Planar mode. FIG. 1 illustrates the prediction directions for the 33 angular intra prediction modes of the HEVC standard, where H represents Horizontal direction mode and V represents Vertical direction mode. An intra predictor for a current block coded or to be coded by intra prediction of HEVC is generated by three steps including intra smoothing filter, intra prediction and intra gradient filter. FIG. 2 illustrates exemplary reference samples filtered by an intra smoothing filter for deriving an intra predictor for a current block. A smoothing operation is applied to reference samples 22 of the current block 20 before calculating the intra predictor for the current block 20. The smoothing operation reduces the discontinuities introduced by some of the intra prediction modes by applying the intra smoothing filter to the reference samples 22 in a left neighboring column and an above neighboring row of the current block 20. This smoothing operation is adaptively applied depending on an intra prediction mode and the size of the current block.

The second step is to derive the intra predictor from neighboring reference samples according to one intra prediction mode selected from the 35 intra prediction modes. If an angular mode is selected, the value of each sample in the current block is predicted by extrapolating the samples from the reference samples according to the prediction direction of the selected angular mode. The value of each sample in the current block is calculated assuming an amplitude surface with a horizontal and vertical smooth gradient derived from the boundaries samples of the neighboring blocks if Planar mode is selected. The value of each samples of the current block is an average of the reference samples if DC mode is selected.

An intra gradient filter is applied to samples at the left and top boundaries of the current block in the third step if the intra prediction mode is DC, Horizontal, or Vertical mode. The concept of applying the intra gradient filter is to utilize the gradient information along the intra prediction direction to improve the quality of the intra predictor. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

The selected intra prediction mode is signaled explicitly or inferred from previously decoded modes of the above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, another flag is sent to indicate which of the three MPMs is selected; if the first MPM flag is false, the selected mode is explicitly signaled using a 5-bit fixed length codeword.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. An example of 65 angular modes for intra prediction is shown in FIG. 3, where k is ranged from −16 to 16, and mode H−16 and mode V−16 are the same mode as this mode refers to the prediction direction from an upper-left corner to the center of the current block. FIG. 3 illustrates the 65 angular intra prediction modes with additional 32 angular modes in between the original 33 angular modes of HEVC. The 65 angular modes in FIG. 3 include modes H+16 to H−15 from bottom to top at the left boundary of the block and modes V−16 to V+16 from left to right at the upper boundary of the block.

A partitioning structure called Quad-Tree-Binary-Tree (QTBT) structure combines a quadtree structure with a binary tree structure, which balances the coding efficiency and the coding complexity. An exemplary QTBT structure is shown in FIG. 4A, where a large block is firstly partitioned by a quadtree structure then a binary tree structure. FIG. 4A illustrates an example of block partitioning according to the QTBT structure and FIG. 4B illustrates a tree diagram for the QTBT structure corresponding to the block partitioning shown in FIG. 4A. The solid lines in FIGS. 4A and 4B indicate quadtree splitting while the dotted lines indicate binary tree splitting. In each splitting (i.e., non-leaf) node of the binary tree structure, one flag indicates which splitting type (symmetric horizontal splitting or symmetric vertical splitting) is used, 0 indicates horizontal splitting and 1 indicates vertical splitting. The QTBT structure splits the large block in FIG. 4A into multiple smaller blocks, and these smaller blocks may be processed by prediction and transform coding without further splitting. In an example, the large block in FIG. 4A is a coding tree unit (CTU) with a size of 128×128, a minimum allowed quadtree leaf node size is 16×16, a maximum allowed binary tree root node size is 64×64, a minimum allowed binary tree leaf node width or height is 4, and a minimum allowed binary tree depth is 4. In this example, the leaf quadtree block may have a size from 16×16 to 128×128, and if the leaf quadtree block is 128×128, it cannot be further split by the binary tree structure since the size exceeds the maximum allowed binary tree root node size 64×64. The leaf quadtree block is used as the root binary tree block that has a binary tree depth equal to 0. When the binary tree depth reaches 4, non-splitting is implicit; when the binary tree node has a width equal to 4, non-vertical splitting is implicit; and when the binary tree node has a height equal to 4, non-horizontal splitting is implicit.

For CTUs coded in I slice, the QTBT block partitioning for a chroma coding tree block (CTB) can be different from the QTBT block partitioning for a corresponding luma CTB. Different chroma samples within the chroma coding unit (CU) may correspond to different luma CUs, so when a chroma CU is coded in Intra direct mode (DM), an upper left chroma pixel of the chroma CU is used to locate a corresponding luma pixel, and the intra prediction mode of the corresponding luma pixel will be selected as the intra prediction mode for the chroma CU.

BRIEF SUMMARY OF THE INVENTION

A method and apparatus for processing image or video data by intra prediction in an image or video coding system are disclosed. Embodiments of an image or video coding system receive input data associated with a current block in a current picture, and the current block is coded or to be coded by intra prediction. A current mode set is determined for the current block, and the current mode set includes multiple intra prediction modes. A current intra prediction mode for deriving an intra predictor for the current block is selected from the intra prediction modes in the current mode set. Embodiments of the image or video coding system derives a number of most probable modes (MPMs) in an MPM set from the number of intra prediction modes in the current mode set as the number of MPMs varies with the number of intra prediction modes in the current mode set. The MPMs for the current block is determined and the current block is encoded or decoded according to the current intra prediction mode. The current intra prediction mode is coded using an MPM flag if the current intra prediction mode is equal to one of the MPMs, and the current intra prediction mode is coded using fixed length coding if the current intra prediction mode is not equal to any of the MPMs.

In an embodiment, the number of intra prediction modes in the current mode set is variable depending on a block size of the current block. The block size is measured by a block area of the current block, a longer side of the current block, or a shorter side of the current block, where the longer side is a maximum of a block width and a block height and the shorter side is a minimum of the block width and the block height. Two or more thresholds are used to compare with the block size of the current block to determine the current mode set for the current block.

In another embodiment, the intra prediction modes in the current mode set include a combined mode and the intra predictor derived according to the combined mode is a weighted average of two predictors derived from two prediction directions. When two neighboring modes of the current block is angular modes, one MPM is a middle angular mode derived from the two neighboring modes, and the middle angular mode corresponds to a direction in the middle of two directions of the two neighboring modes. A method of deriving the number of MPMs in the MPM set from the number of intra prediction modes in the current mode set is by deducting two to the power of n (i.e. $2^n$) from the number of intra prediction modes in the current mode set, where n is an integer greater than 1. The number of intra prediction modes in the current mode set is greater than two to the power of n and is less than two to the power of n+1 (i.e. $2^n<$the number of intra prediction modes $<2^{n+1}$).

In some embodiments, the image or video coding system receives input data associated with a current block in a current picture, and the current block is a non-square block coded or to be coded by intra prediction. A current mode set is selected from multiple mode sets according to one or both of a longer side and a shorter side of the current block. A maximum of a width and a height of the current block is the longer side of the current block, and a minimum of the width and the height of the current block is the shorter side of the current block. The image or video coding system determines a current intra prediction mode from the current mode set to derive an intra predictor for the current block, and encodes or decodes the current block according to the current intra prediction mode Embodiments of determining the current mode set include comparing the longer side or the shorter side of the current block with two or more thresholds. For example, two thresholds are used to determine the current mode set from three mode sets. In some embodiments, an uneven distribution of intra prediction modes is assigned to two sides of the current block. A first set of angular modes is assigned to the longer side and a second set of angular modes is assigned to the shorter side, and the current mode set includes both the first set and the second set of angular modes. The first set of angular modes is determined depending on a length of the longer side and the second set of angular modes is determined depending on a length of the shorter side, alternatively, the first set of angular modes is determined depending on a length of the perpendicular side, that is the shorter side; and the second set of angular mode is determined depending on a length of the perpendicular side, that is the longer side. In an embodiment, the first set of angular modes has more angular modes than the second set of angular mores.

In yet another embodiment, a coding method of the current intra prediction mode is selected depending on the number of intra prediction modes in the current mode set, for example, if the number of intra prediction modes in the current mode set is greater than a threshold, one or more most probable modes (MPMs) may be used to code the current intra prediction mode, else fixed length coding, truncated binary coding, exponential-golomb coding, or variable length coding may be used to code the current intra prediction mode.

Aspects of the disclosure further provide an apparatus for the image or video coding system for compression data by intra prediction. Embodiments of the apparatus adaptively selects a current mode set for a current block, and a number of MPMs in an MPM set varies with a number of intra prediction modes in the current mode set. Another embodiment of the apparatus selects the current mode set from multiple mode sets for a non-square block according to a longer side of the current block, a shorter side of the current block, or both.

Aspects of the disclosure further provide a non-transitory computer readable medium storing program instructions for causing a processing circuit of an apparatus to perform an intra prediction method for image or video processing. An embodiment of the intra prediction method derives a number of MPMs from a number of intra prediction modes in a current mode set. Another embodiment of the intra prediction method includes selecting a current mode set for a current block according to a block size measured by a block area, longer side, or shorter side of the current block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
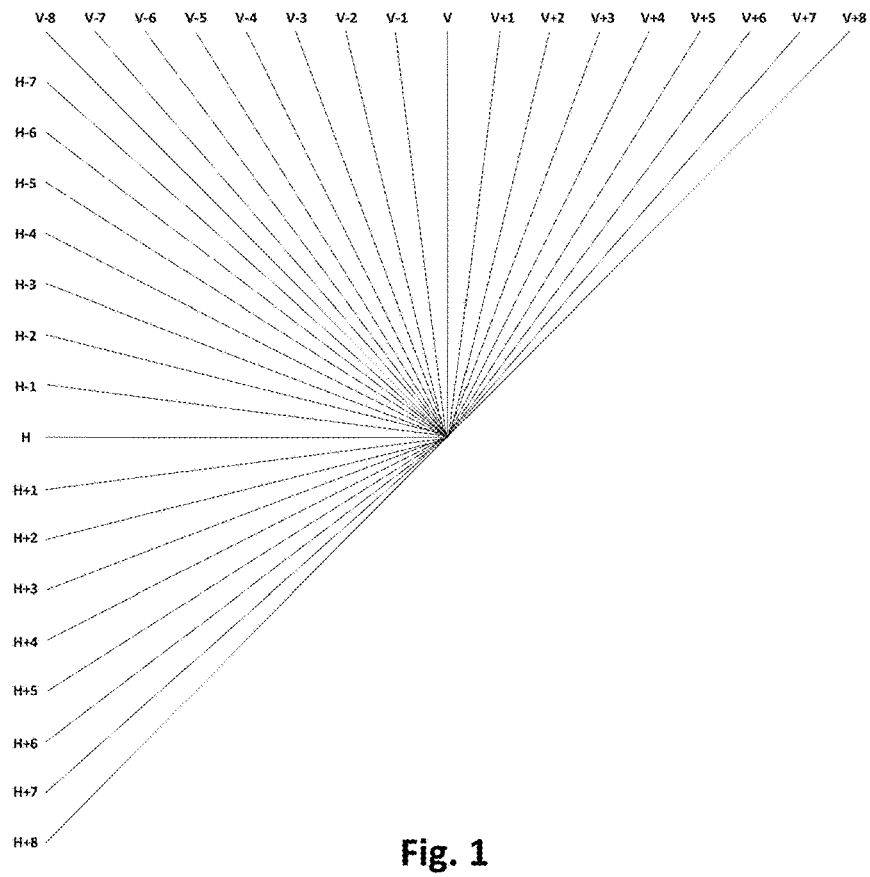
FIG. 1 illustrates 33 angular intra prediction modes supported in the HEVC standard.
Figure 2:
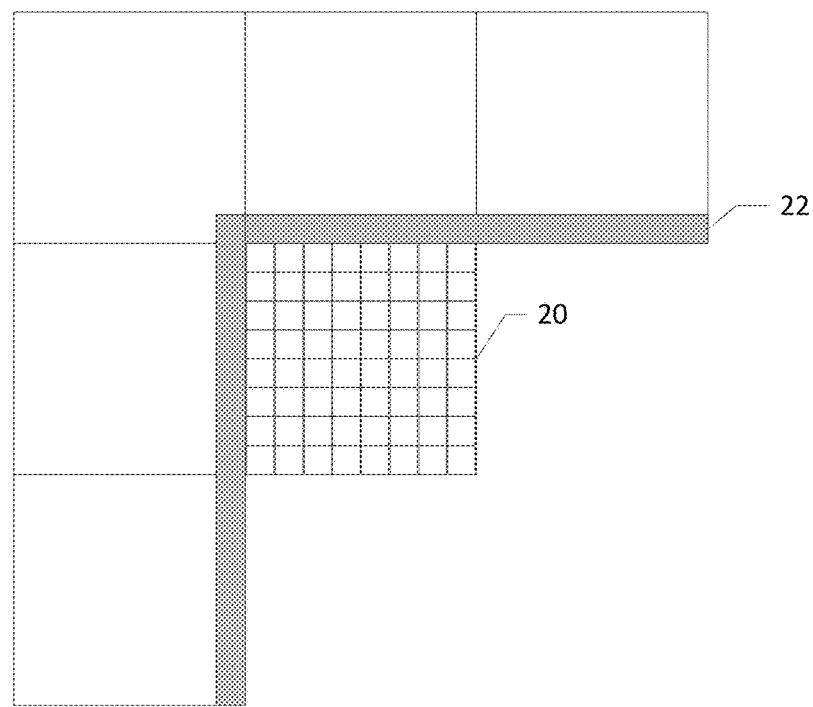
FIG. 2 illustrates exemplary reference samples filtered by an intra smoothing filter for deriving an intra predictor for a current block.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Intra prediction is only applied to 16×16 square blocks in the H.264/AVC standard and block sizes ranged from 4×4 to 64×64 square blocks in the HEVC standard. The video coding standard under developed supports more flexible block sizes generated by a partitioning structure such as the QTBT structure, for example, intra and inter prediction can be applied to both square and rectangle blocks ranged from block sizes 4×4 to 256×256. The present application describes various intra prediction methods for improving the coding efficiency of processing image or video blocks with more flexible block sizes.

First Embodiment

In a first embodiment, a number of most probable modes (MPMs) in an MPM set for coding a current block varies with a total number of intra prediction modes that can be used for coding the current block. Embodiments of the present invention assume all pixels in an intra coded block to be predicted using the same intra prediction mode. A total number of intra prediction mode available for encoding or decoding a current block is set to be N, where N is greater than two to the power of n and is less than or equal to two to the power of n+1 (i.e. $2^n < N <= 2^{n+1}$). The number of MPMs in the MPM set is derived from the number of intra prediction modes N in the first embodiment, for example the number of MPMs is $M=N-2^n$ and the number of remaining modes is equal to $2^n$. The $2^n$ remaining modes can be coded using n-bits fixed length coding. Depending on the number of MPMs M derived from the total number of intra prediction modes N for the current block, the MPMs need to be sophisticated designed to increase the probability of matching with the current intra prediction mode used for coding the current block.

Figure 3:
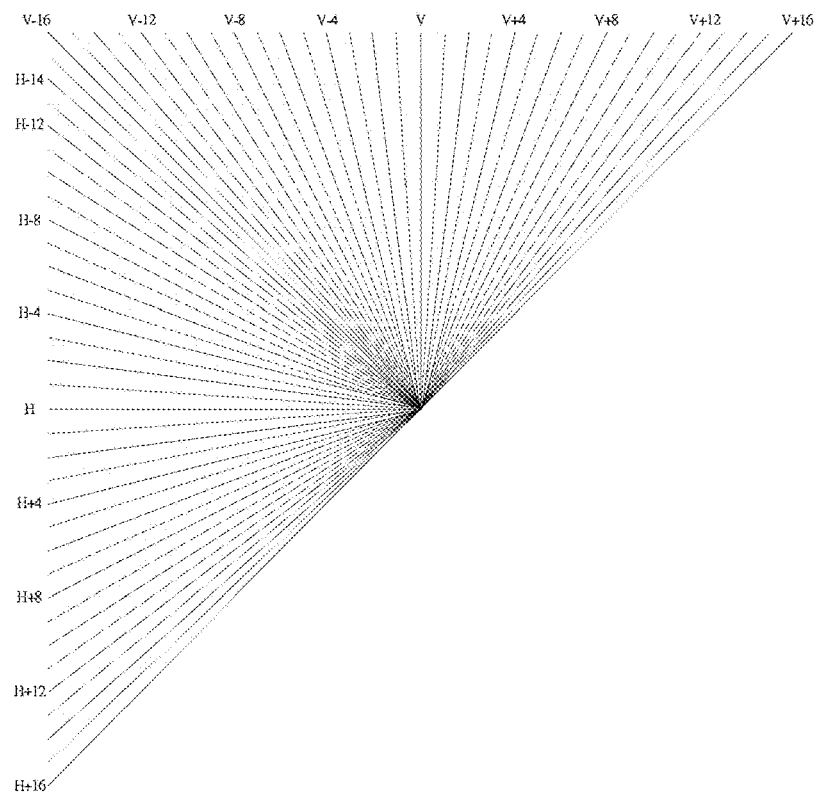
FIG. 3 illustrates an example of 65 angular intra prediction modes.

A current intra prediction mode of a current block is selected from a current mode set consisting of 66 intra prediction modes (N=66) in a first example of the first embodiment, and the number of MPMs is derived to be 2 ($M=66-2^6$). One bit of MPM flag is signaled to represent which of the two MPMs is selected in this first example if the current intra prediction mode is equal to one of the MPMs. The 66 intra prediction modes include DC mode, Planar mode, and 64 angular modes. An example of the 64 angular modes includes 63 out of the 65 angular modes as shown in FIG. 3 plus a combined mode. Two modes in outer most diagonal directions, modes H+16 and V+16 in FIG. 3, are combined into the combined mode using a weighted average of the two predictors separately derived from the two modes H+16 and V+16. In one example, weightings for the weighted average are factors of distances between a current pixel in the current block and corresponding predictor pixels in predictor blocks, and the further the distance, the less the weighting. The two MPMs are derived from neighboring intra prediction modes of two neighboring coded blocks, for example, the left and above neighboring blocks of the current block. If the two neighboring intra prediction modes are the same, or if one of the neighboring intra prediction mode is unavailable, DC mode or Planar mode is used to fill the candidate in the MPM set. If none of the neighboring intra prediction mode is available from the two neighboring coded blocks, DC and Planar modes are inserted in the MPM set for the current block. The current intra prediction mode is coded by 6 bits of fixed length coding if the current intra prediction mode is not equal to any of the MPMs.

A current intra prediction mode of a current block is selected from a current mode set consisting of 67 intra prediction modes (N=67) in a second example of the first embodiment, and the number of MPMs is derived as 3 ($M=67-2^6$). The 67 intra prediction modes include the 65 angular modes in FIG. 3, DC mode and Planar mode. The three MPMs may consist up to two neighboring mode from the left and above neighboring blocks of the current block. If the two neighboring modes are the same or one of the two neighboring modes is unavailable, and the only neighboring mode inserted in the MPM set is directional based mode, two neighboring directions of an equal distance next to this neighboring mode are used as the second and third MPMs in the MPM set. For example, angular mode M is the only available neighboring mode of the current block, two neighboring modes M+n and M−n of mode M are selected, where n is a positive integer. Modes M+n, M−n, and M are inserted in the MPM set for encoding or decoding the current block. If two neighboring modes are both available and are different angular modes, DC or Planar mode is used to fill the candidate in the MPM set to ensure the three MPMs are different.

Figure 5:
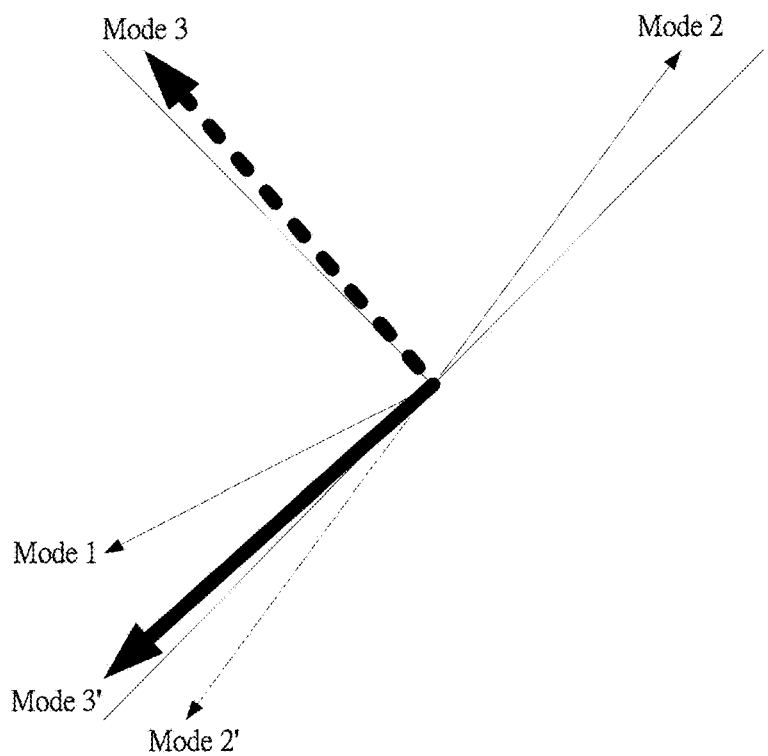
FIG. 5 illustrates various methods for deriving a middle mode between two angular modes.
Figure 4A:
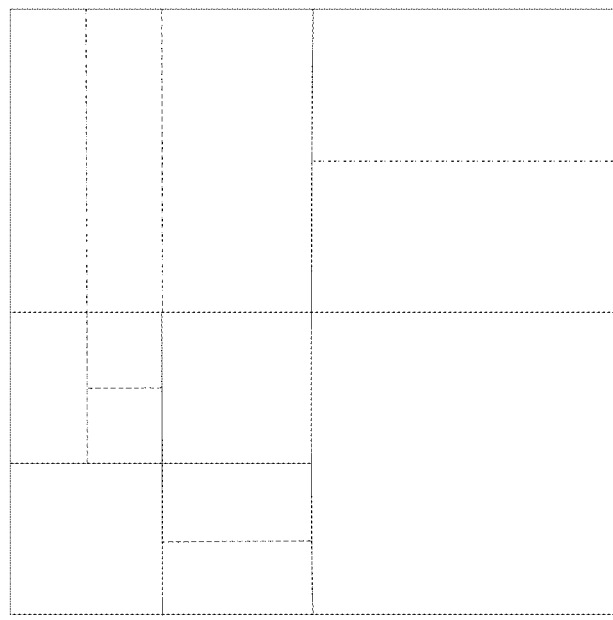
FIG. 4A illustrates an exemplary block partition according to a Quad-Tree-Binary-Tree (QTBT) structure.
Figure 4B:
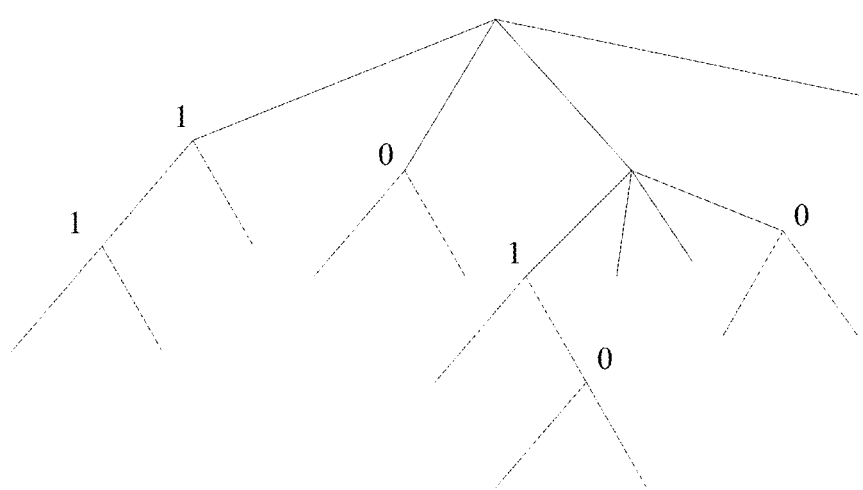
FIG. 4B illustrates a coding tree structure corresponding to the block partition of FIG. 4A.

In another example, if both neighboring modes are available and are different angular modes, a middle mode is used as the third MPM in the MPM set. The middle mode corresponds to an angular mode which has a direction in the middle of the two directions of the two neighboring modes. FIG. 5 illustrates an example of determining MPMs including a middle mode. Neighboring modes Mode 1 and Mode 2 are the two available angular modes, and a middle mode Mode 3=(Mode 1+Mode 2)/2, represented in thick dotted arrow line, is the averaged angle of Mode 1 and Mode 2. If (Mode 1+Mode 2)/2 is not an integer, Mode 3 can be round up or round down. The three MPM in this example include Mode 1, Mode 2, and Mode 3. In some embodiments, when the direction of one or two neighboring modes is near the diagonal boundary, its reverse extended angle is used to generate the angle for the middle mode. In another example, when the distance of the two neighboring modes is too far, for example, when the absolute of M-N is greater than a threshold, the reverse extended angle is used. In FIG. 5, Mode 2' is the mode with a reverse extended angle of Mode 2 (i.e. Mode 2'=Mode 2+180 degrees), and a middle mode Mode 3', represented in thick solid arrow line, is calculated by an average direction of Mode 1 and Mode 2'. Similarly, the mode with the reverse extended angle of Mode 1 (i.e. Mode 1'=Mode 1+180 degrees) can be used to derive the middle mode.

If one of the two neighboring modes is DC or Planar mode, while the other neighboring mode is an angular mode, the third MPM is set as Planar mode if the neighboring mode is DC mode or set as DC mode if the neighboring mode is Planar mode. If the two neighboring modes are DC and Planar mode, or if none of the neighboring block is coded by intra prediction, or if one neighboring mode is DC or Planar while the other neighboring mode is unavailable, the MPMs in the MPM set may include DC and Planar modes, and a third MPM in the MPM set may be either Vertical or Horizontal mode.

A current intra prediction mode of a current block is selected from a current mode set consisting of 68 intra prediction modes (N=68) in a third example of the first embodiment, and the number of MPMs is derived as 4 ($M=68-2^6$). Two-bits MPM flag can be used to choose one MPM out of the four MPMs if the current intra prediction mode is equal to one of the MPMs. In addition to DC mode, Planar mode, and the 65 or 64 angular modes, one or two new intra prediction mode are included in the current mode set in this example. Some examples of the new intra prediction modes can be combined mode and planar mode variations. The MPM set may include one or more neighboring modes of neighboring coded blocks. For example, if two neighboring modes are the same or one of the two neighboring modes is unavailable, and the only available neighboring mode is a directional based mode, the available neighboring mode is the first MPM in the MPM set. Two neighboring directions of equal distance next to the available neighboring mode are selected as the second and third MPMs. For example, angular mode M is the only available neighboring mode of the current block, two neighboring modes M+n and M−n of mode M as well as mode M are inserted in the MPM set for the current block.

If two neighboring modes are both available and are different angular modes, DC and Planar modes are inserted in the MPM set to ensure four MPMs are different. In another embodiment, a third MPM is derived as the mode corresponding to an average angle of the two angles of the two neighboring modes, and a fourth MPM is DC mode or Planar mode. If none of the neighboring mode is available from the two neighboring blocks of the current block, the MPM set consists of DC, Planar, Vertical and Horizontal modes. In another embodiment, the first four available modes from a set of candidates are selected as MPMs. An example of the set of candidates is {top, left, Planar, DC, Vertical, Horizontal}.

Figure 6:
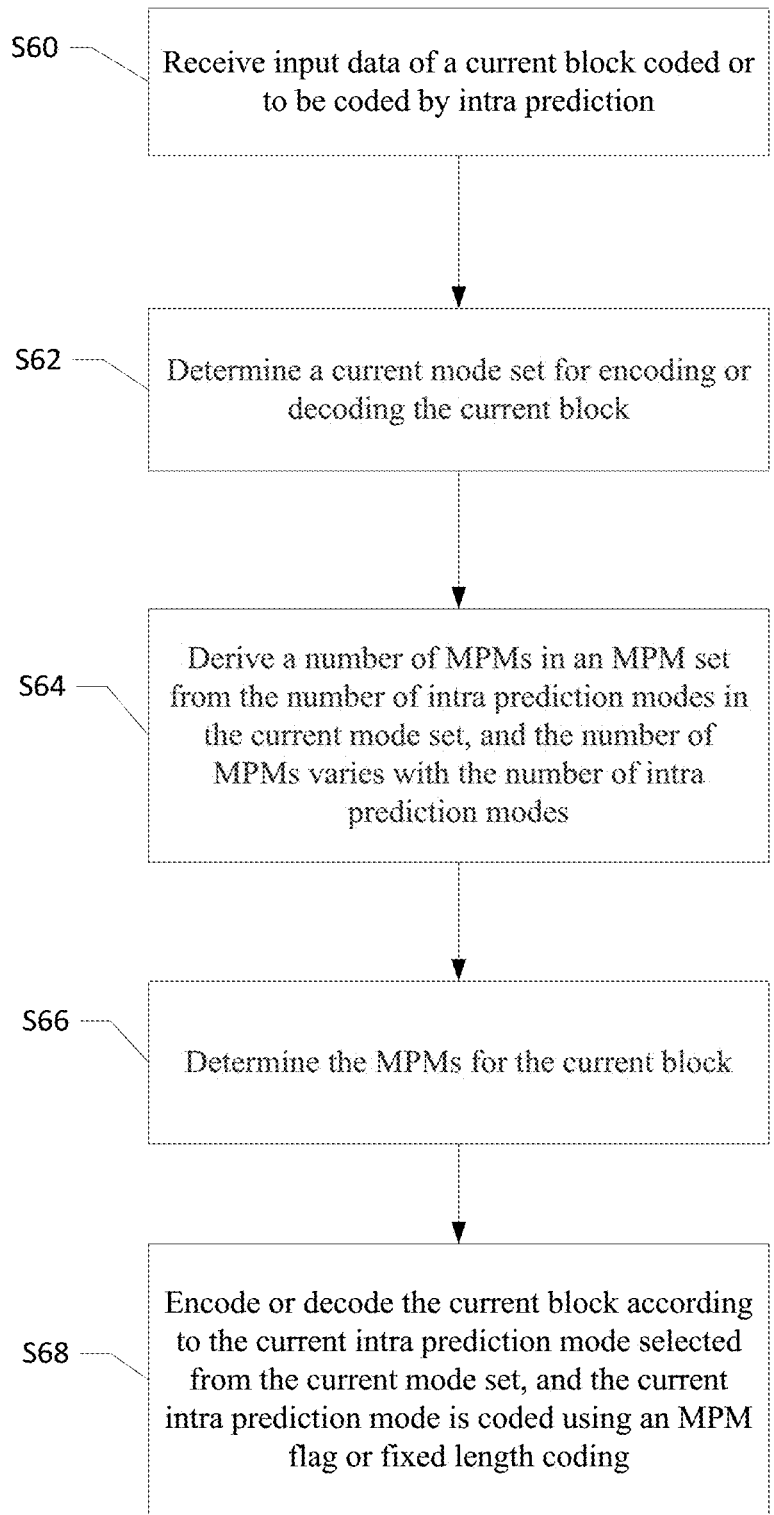
FIG. 6 is a flowchart illustrating an exemplary intra prediction method according to an embodiment of the present invention.

FIG. 6 is a flowchart illustrating an exemplary method for processing a current block in a current picture by intra prediction according to the first embodiment of the present invention. An encoder or decoder receives input data associated with the current block coded or to be coded by intra prediction in step S60, and adaptively determines a current mode set for coding the current block in step S62. The current mode set includes multiple intra prediction modes and a current intra prediction mode for coding the current block is selected from the current mode set. A number of most probable modes (MPMs) in an MPM set is derived from a number of intra prediction modes in the current mode set in step S64. The number of MPMs in the MPM set varies with the number of intra prediction modes in the current mode set. In step S66, one or more MPMs are determined for the current block, for example, the MPMs are determined based on neighboring modes of neighboring coded block of the current block or a predetermined candidate set. The encoder or decoder in step S68 encodes or decodes the current block according to the current intra prediction mode. The current intra prediction mode is coded using an MPM flag if the current intra prediction mode is equal to one of the MPMs, and the current intra prediction mode is coded using fixed length coding if the current intra prediction mode is not equal to any of the MPMs.

Second Embodiment

A second embodiment of the intra prediction method adaptively determines a current mode set from multiple mode sets for coding a current block. Each mode set differs from other mode sets by including either different numbers of intra prediction modes or include at least one different intra prediction mode. The current mode set may be determined according to a block size of the current block. The block size may be measured by a block area calculated by a width multiplied by a height, a longer side, or a shorter side of the current block. The current mode set may be determined according to different types of image or video contents, for example, different mode sets are used for coding screen content video and natural content video. It is also possible to select the current mode set from multiple mode sets according to both the block size and the type of content of the current block.

Figure 7A:
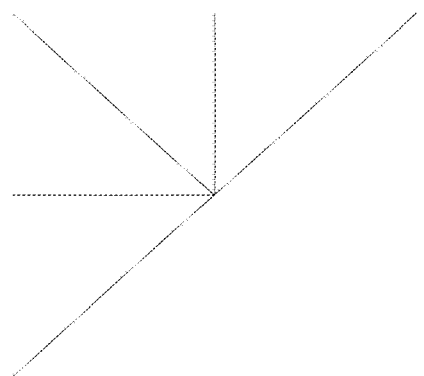
FIGS. 7A-7C illustrate examples of 5, 9 and 17 angular intra prediction modes respectively.
Figure 7B:
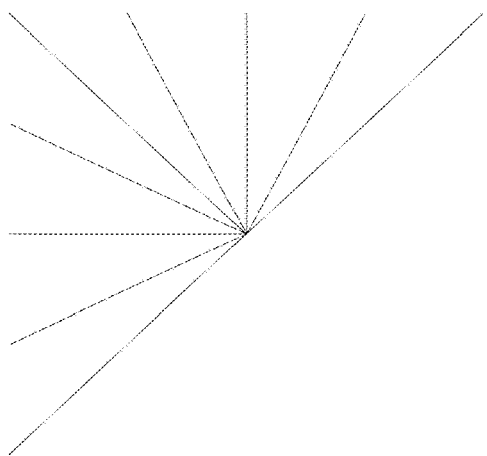
Figure 7C:
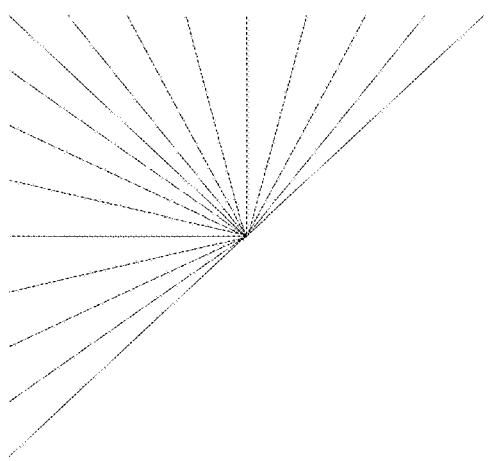

For a current block coded or to be coded by intra prediction according to this embodiment, a current mode set is selected from multiple mode sets according to the block size of the current block. Each of the multiple mode sets includes one or more intra prediction modes. In a first example of the second embodiment, there are five thresholds Area_1, Area_2, Area_3, Area_4 and Area_5 used to select the current mode set from six mode sets. Intra prediction modes in a first mode set ModeSet1 are used for intra prediction if the block area of the current block is less than or equal to Area_1; intra prediction modes in a second mode set ModeSet2 are used for intra prediction if the block area is greater than Area_1 and less than or equal to Area_2; and intra prediction modes in a third mode set ModeSet3 are used for intra prediction if the block area is greater than Area_2 and less than or equal to Area_3. Intra prediction modes in a fourth mode set ModeSet4 are used for intra prediction if the block area is greater than Area_3 and less than or equal to Area_4; intra prediction modes in a fifth mode set ModeSet5 are used for intra prediction if the block area is greater than Area_4 and less than or equal to Area_5; and intra prediction modes in a sixth mode set ModeSet6 are used for intra prediction if the block area is greater than Area_5. Examples of the five thresholds are 16×N samples, where N=1 for Area_1, N=2 for Area_2, N=3 for Area_3, N=4 for Area_4 and N=5 for Area_5. The number of intra prediction modes in each mode set of ModeSet1 to ModeSet6 may be different, and the number of angular modes in each mode set may be 33 directional modes as shown in FIG. 1, 65 directional modes as shown in FIG. 3, or may be 5, 9, or 17 directional modes as shown in FIGS. 7A, 7B and 7C respectively, or may be 3 (vertical, horizontal and diagonal top-left modes), 2 (vertical and horizontal modes) or 0 directional modes. Each mode set of ModeSet1 to ModeSet6 may further include non-angular modes such as DC mode and Planar mode.

A second example of the second embodiment simplifies the first example by assigning the current mode set to the current block according to only two thresholds Area_1 and Area_2. Intra prediction modes in a first mode set ModeSet1 are used for intra prediction if the block area is less than or equal to Area_1; intra prediction modes in a second mode set ModeSet2 are used for intra prediction if the block area is greater than Area_1 and less than or equal to Area_2; and intra prediction modes in a third mode set ModeSet3 are used for intra prediction if the block size is greater than Area_2. For example, the first mode set ModeSet1 includes 33 angular modes, the second mode set ModeSet2 includes 65 angular modes, and the third mode set ModeSet3 includes 129 angular modes; the two thresholds Area_1 and Area_2 may be 16 pixels and 64 pixels respectively, or the two threshold Area_1 and Area_2 may be 32 pixels and 256 pixels respectively for larger resolution. Some possible numbers of angular modes assigned for various block sizes are listed in Table 1.

TABLE 1

| Block Area (samples) | Number of angular modes | | | | | |
|---|---|---|---|---|---|---|
| <=16 | 17 | 33 (or 65) | 65 | 65 | 65 | 65 |
| <=32 && <=1024 | 33 | 33 (or 65) | 65 | 65 | 65 | 65 |
| =2048 | 65 | 65 | 65 | 65 | 65 | 65 |
| =4096 | 65 | 65 | 5 | 3 | 2 | 0 |
| >4096 | 65 | 65 | 5 | 3 | 2 | 0 |

Table 1 only lists the number of angular modes in the mode set assigned to each block area, these mode sets may also include some non-angular modes so the total number of intra prediction mode in the mode sets may be the number shown in Table 1 plus a number of non-angular modes (e.g. 2). In general, the larger the block area, the more angular modes are assigned for intra prediction, however, larger blocks may require less intra prediction modes in some cases. An experiment for searching the optimum number of intra prediction modes suggests larger blocks tend to select from only a few intra prediction modes, it is observed that the coding efficiency can be improved by only assigning four intra prediction modes to 64×64 blocks in screen content coding.

A third example of the second embodiment replaces the block area by a length of a longer side or a length of a shorter side of the current block. The longer side is a maximum of the width and height of the current block, and the shorter side is a minimum of the width and height of the current block. The thresholds for block area Area_1 to Area_5 are replaced by length thresholds Length_1 to Length_5. Mode set selection is solely depending on the longer side according to one embodiment, where intra prediction modes in ModeSet1 are used for intra prediction if the longer side is less than or equal to Length_1; intra prediction modes in ModeSet2 are used for intra prediction if the longer side is greater than Length_1 and less than or equal to Length_2; intra prediction modes in ModeSet3 are used for intra prediction if the longer side is greater than Length_2 and less than or equal to Length_3; intra prediction modes in ModeSet4 are used for intra prediction if the longer side is greater than Length_3 and less than or equal to Length_4; intra prediction modes in ModeSet5 are used for intra prediction if the longer side is greater than Length_4 and less than or equal to Length_5; and intra prediction modes in ModeSet6 are used for intra prediction if the longer side is greater than Length_5. In another embodiment, the mode set is selected solely depending on the shorter side of the block. The length thresholds Length_1 to Length_5 for the shorter side may be equal to 4×N or $2^N$ samples, where N is a positive integer number, for example, Length_1 is 4, Length_2 is 8, Length_3 is 16, Length_4 is 32, Length_5 is 64.

Some variations of the third example use more or less thresholds to determine the mode set, such as using two thresholds with three different mode sets, or using three thresholds with four different mode sets. For example, intra prediction modes in ModeSet1 are used for intra prediction if the shorter side is less than or equal to Length_1; intra prediction modes in ModeSet2 are used for intra prediction if the shorter side is greater than Length_1 and less than or equal to Length_2; and intra prediction modes in ModeSet3 are used for intra prediction if the shorter side is greater than Length_2.

Third Embodiment

Figure 8:
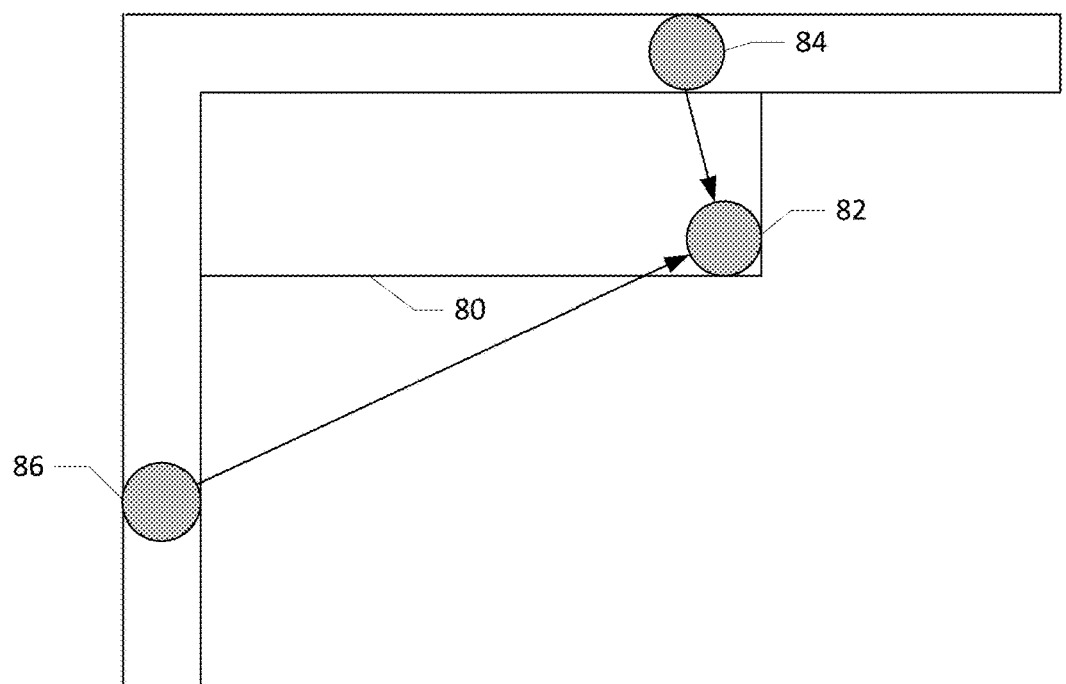
FIG. 8 illustrates an example of two possible intra predictor samples for a to-be-predicted pixel from different sides of a non-square block.

A third embodiment may assign uneven number of angular intra prediction modes to two sides of a block when coding the block by intra prediction. The efficiency of intra prediction becomes less reliable when an intra predictor sample in a neighboring row or neighboring column is too far away from a to-be-predicted pixel. To code a non-square block, the intra predictor sample on the shorter side of the non-square block is far apart from some to-be-predicted pixels in the non-square block. An example is shown in FIG. 8, where a to-be-predicted pixel 82 in a non-square block 80 may be coded by an intra predictor sample 84 from the longer side or an intra predictor sample 86 from the shorter side. The intra predictor sample 84 from the longer side is closer to the to-be-predicted pixels 82 than the intra predictor sample 86 from the shorter side and therefore is more reliable. In such cases, there is no need to support a large set of angular modes for the shorter side of the block as fewer angular modes should be enough to achieve high coding efficiency while keeping a low signaling overhead and computing complexity. In general, more angular modes should be assigned to the longer side of the block than the shorter side, however, when the lengths of both sides are large, a smaller set of intra prediction modes may be used.

In the following examples, N angular modes assigned for one side of a block for intra prediction refers to candidate modes on this side match those angular modes that are used for regular intra prediction for square block when a total number of angular modes used for both sides is N. For example, to code an 8×4 block (width is 8 and height is 4) according to the third embodiment, 65 angular modes are assigned to the side with block length 8 while 9 angular modes are assigned to the side with block length 4. The angular modes on the left side of intra prediction using 9 angular mode as shown in FIG. 7B and the angular modes on the upper side of intra prediction using 65 angular modes as shown in FIG. 3 are used to code the 8×4 block. The total number of angular modes used for coding this 8×4 block by intra prediction is therefore 37 modes, which is calculated by summing 32 modes for the longer side, 4 modes for the shorter side, and 1 diagonal mode in between the two sides.

A first example of the third embodiment determines two sets of angular modes for the above side (width) and the left side (height) of a current block according to the corresponding lengths of the width and height respectively. A first set of angular modes is selected for the width or the longer side of the current block from six mode sets ModeSet1 to ModeSet6 according to the length of the width or the longer side, and a second set of angular modes is selected for the height or shorter side of the current block from the six mode sets according to the length of the height or the shorter side. The total number of angular modes used for intra prediction of the current block is the sum of the two sets of angular modes plus one diagonal mode in between the two sides. Beside the angular modes, the current block may also be coded using one or more non-angular modes such as DC mode and Planar mode. In this example, there are five length thresholds Length_1 to Length_5 for classifying the six mode sets. Angular modes in ModeSet1 along one side of the current block are used for intra prediction if the length of this side is less than or equal to Length_1; angular modes in ModeSet2 along one side of the current block are used for intra prediction if the length of this side is greater than Length_1 and less than or equal to Length_2; angular modes in ModeSet3 along one side of the current block are used for intra prediction if the length of this side is greater than Length_2 and less than or equal to Length_3; angular modes in ModeSet4 along one side of the current block are used for intra prediction if the length of this side is greater than Length_3 and less than or equal to Length_4; angular modes in ModeSet5 along one side of the current block are used for intra prediction if the length of this side is greater than Length_4 and less than or equal to Length_5; and angular modes in ModeSet6 along one side of the current block are used for intra prediction if the length of this side is greater than Length_5.

A second example of the third embodiment determines a set of angular modes for each side of the current block according to its perpendicular side. In this example, the total number of angular modes for the current block is the sum of the two sets of angular modes plus one diagonal mode in between the two sides. Angular modes in ModeSet1 along one side of the current block are used for intra prediction if the block length of the perpendicular side is less than or equal to Length_1; angular modes in ModeSet2 along one side of the current block are used for intra prediction if the block length of the perpendicular side is greater than Length_1 and less than or equal to Length_2; angular modes in ModeSet3 along one side of the current block are used for intra prediction if the block length of the perpendicular side is greater than Length_2 and less than or equal to Length_3; angular modes in ModeSet4 along one side of the current block are used for intra prediction if the block length of the perpendicular side is greater than Length_3 and less than or equal to Length_4; angular modes in ModeSet5 along one side of the current block are used for intra prediction if the block length of the perpendicular side is greater than Length_4 and less than or equal to Length_5; angular modes in ModeSet6 along one side of the current block are used for intra prediction if the block length of the perpendicular side is greater than Length_5.

The first and second examples may set the thresholds equal to 4×N samples, where N is a positive integer number. Some variations of the first and second examples may use less thresholds to classify less mode sets, for example, one threshold Length_1 is used to classify two mode sets for each side of the current block. The first and second examples of the third embodiment can be applied to either the longer side or the shorter side of the current block. For example, the method described in the first example is used to determine the number of angular modes for the shorter side of the current block by comparing the length of the shorter side with the length threshold(s). Alternatively, the method described in the second example is used to determine the number of angular modes for the shorter side of the current block by comparing the length of the longer side with the length threshold(s). It is also possible to apply both methods described in the first and second examples to one side, and a resulting number of angular modes for this side is a maximum or minimum number derived from the two methods.

One way to set the number of angular modes in each mode set for one side of the current block is by assigning more angular modes to longer length of this side or assigning more angular modes to longer length of its perpendicular side. The above disclosed exemplary methods in the second and third embodiments may or may not use one or more non-angular modes in addition to the angular modes in intra prediction.

Figure 9:
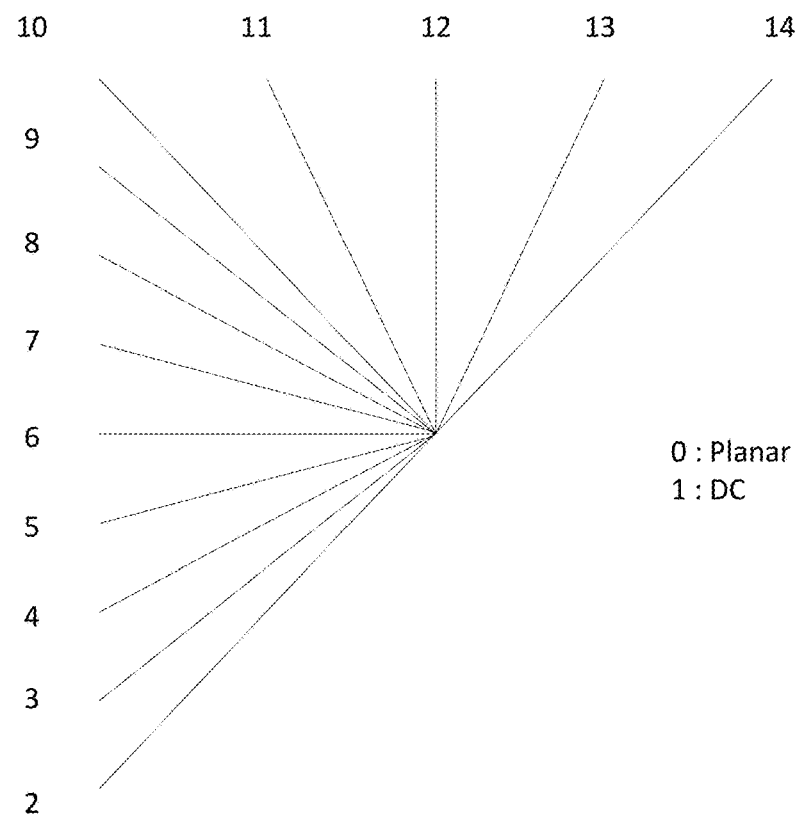
FIG. 9 illustrates an exemplary uneven distribution of angular intra prediction modes on two sides of a block.

FIG. 9 illustrates a total of 15 intra prediction modes for coding a non-square block. The 15 intra prediction modes include 2 non-angular modes (Mode 0: Planar and Mode 1: DC) and 13 angular modes (Mode 2 to Mode 14). The width of the non-square block is the shorter side and the height of the non-square block is the longer side in this example. The length of the width maps to four angular modes (Mode 11 to Mode 14) and the length of the height maps to eight angular modes (Mode 2 to Mode 9). The diagonal mode (Mode 10) in between the two sides of the non-square block is also included in the current mode set for coding the non-square block.

Figure 10:
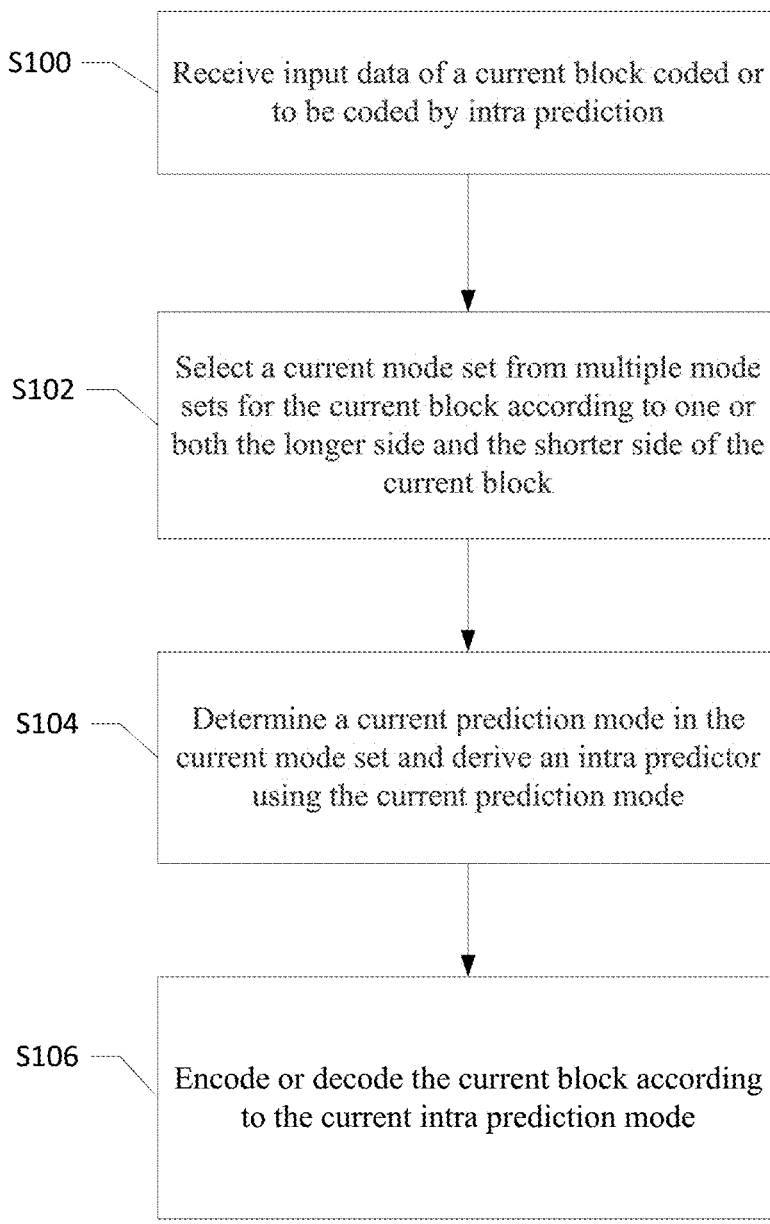
FIG. 10 is a flowchart illustrating an exemplary intra prediction method according to an embodiment of the present invention.

FIG. 10 is a flowchart illustrating an intra prediction method for processing a current block in a current picture according to one or both the second and third embodiments of the present invention. An encoder or decoder receives input data of the current block coded or to be coded by intra prediction in step S100. The current block is a non-square block with a width and a height, where a maximum of the width and height of the current block is a longer side of the current block, and a minimum of the width and height of the current block is a shorter side of the current block. In step S102, a current mode set for the current block is selected from multiple mode sets according to one or both the longer side and the shorter side of the current block. Each mode set includes one or more intra prediction modes, where the number of intra prediction modes in one mode set is different from another mode set or at least one intra prediction mode in each mode set is different from intra prediction modes in another mode set. The encoder or decoder determines a current intra prediction mode selected from the current mode set to derive an intra predictor for encoding or decoding the current block in step S104, and encodes or decodes the current block according to the current intra prediction mode in step S106.

The second embodiment and the third embodiment of the present invention may be applied to encoders only to reduce the coding complexity of the encoders. The encoder may select a mode set including less intra prediction modes than the full set of intra prediction modes when encoding a block according to its block area, length of the longer side, or length of the shorter side. For example, when the full set of intra prediction modes includes 67 intra prediction modes, the encoder considers only 7 intra prediction modes for a length of the longer side less than or equal to 4, considers 35 intra prediction modes for a length of the longer side greater than 4 and less than or equal to 64, and considers 67 intra prediction modes for a length of the longer side greater than 64. The encoder saves encoding time for selecting the intra prediction mode used for encoding smaller blocks by skipping the intra prediction modes not included in the selected mode set. Another example of the encoder according to the third embodiment may consider fewer angular intra prediction modes on the shorter side of the block when encoding a non-square block. The coding method of the current intra prediction mode is still the same for all the block sizes when the present invention is applied to encoders only so the decoders may successfully recover the current intra prediction mode using the unified coding method.

Fourth Embodiment

In a fourth embodiment, an adaptive coding method is applied to encode or decode the current intra prediction mode for the current block. The current intra prediction mode is selected from a current mode set consisting of one or more intra prediction modes. In an example, when the number of intra prediction modes in the current mode set is small, the coding of the current intra prediction is simplified. The simplified coding method for coding the current intra prediction mode may be fixed length coding, truncated binary coding, or exponential-golomb coding without using of most probable modes (MPMs). In a first example of the fourth embodiment, if the total number of intra prediction modes in the current mode set is a power of two, a fixed length coding is applied without using MPMs. For example, if there are only four intra prediction modes in the current mode set including Planar mode, DC mode, Horizontal mode and Vertical mode, two-bits fixed length coding is applied to code these four intra prediction modes. In a second example of the fourth embodiment, if the total number of intra prediction modes in the current mode set is not a power of two, variable length coding is applied to code the current intra prediction mode. The encoder or decoder of the fourth embodiment selects a coding method from multiple coding methods for coding a current intra prediction of the current block according to a number of intra prediction mode in the current mode set. The multiple coding methods may consist of any of the combination of fixed length coding, truncated binary coding, exponential-golomb coding, variable length coding, and an MPM scheme. For example, the current intra prediction mode is coded using the MPM scheme if the number of intra prediction mode in the current mode set is greater than a threshold, else the current intra prediction mode is coded using one of other coding methods. The encoder or decoder first determines if the current intra prediction mode is equal to an MPM in the MPM set when employing the MPM scheme, then encodes or decodes the current intra prediction mode using one or more MPM flag if the current intra prediction mode belongs to the MPM set, or encodes or decodes the current intra prediction mode using a coding method such as fixed length coding if the current intra prediction mode is not equal to any of the MPMs in the MPM set. The number of intra prediction modes in the current mode set in this embodiment may be adaptively determined according to any of the second and third embodiments.

Figure 11:
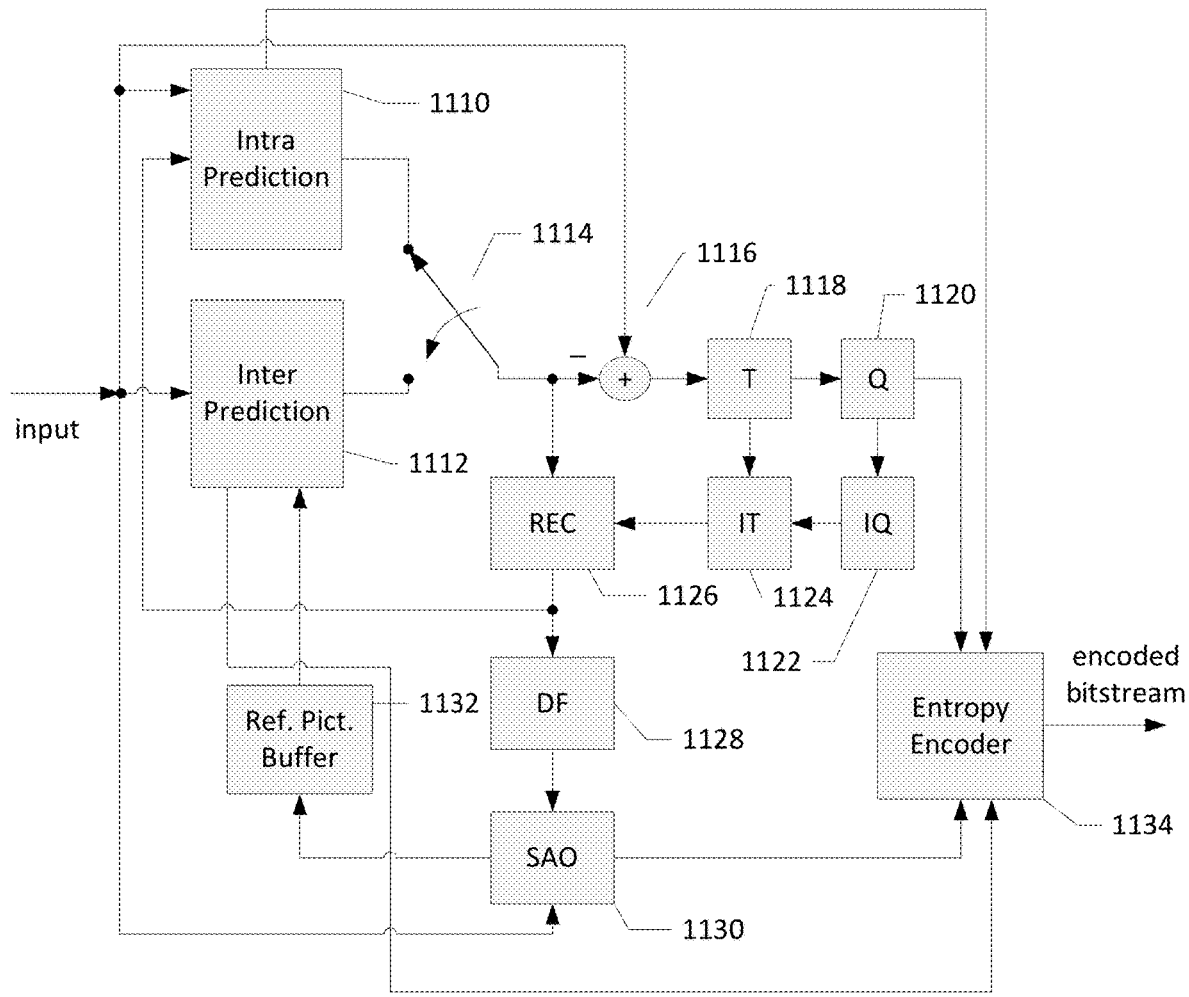
FIG. 11 illustrates an exemplary system block diagram for a video encoding system incorporating the intra prediction method according to embodiments of the present invention.

FIG. 11 illustrates an exemplary system block diagram for a Video Encoder 1100 implementing an intra prediction method of the present invention. Intra Prediction 1110 provides intra predictors based on reconstructed video data of a current picture according to an embodiment of the present invention. A current intra prediction mode of a current block is selected from a current mode set and is coded using a coding method. In an embodiment, the coding method comprises employing a number of MPMs according to the number of intra prediction modes in the current mode set. In another embodiment, the current mode set is determined according to the length of one or both sides of the current block, and an uneven distribution of angular intra prediction modes may be used if the current block is a non-square block. In yet another embodiment, the coding method is determined depending on the number of intra prediction modes in the current mode set. Inter Prediction 1112 performs motion estimation (ME) and motion compensation (MC) to provide predictors based on video data from other picture or pictures. Either Intra Prediction 1110 or Inter Prediction 1112 supplies the selected predictor to Adder 1116 to form prediction errors, also called prediction residues.

The prediction residues of the current block are further processed by Transformation (T) 1118 followed by Quantization (Q) 1120. The transformed and quantized residual signal is then encoded by Entropy Encoder 1134 to form an encoded video bitstream. The encoded video bitstream is then packed with side information. The transformed and quantized residual signal of the current block is processed by Inverse Quantization (IQ) 1122 and Inverse Transformation (IT) 1124 to recover the prediction residues. As shown in FIG. 11, the prediction residues are recovered by adding back to the selected predictor at Reconstruction (REC) 1126 to produce reconstructed video data. The reconstructed video data may be stored in Reference Picture Buffer (Ref. Pict. Buffer) 1132 and used for prediction of other pictures. The reconstructed video data from REC 1126 may be subject to various impairments due to the encoding processing, consequently, in-loop processing Deblocking Filter (DF) 1128 and Sample Adaptive Offset (SAO) 1130 are applied to the reconstructed video data before storing in the Reference Picture Buffer 1132 to further enhance picture quality. Syntax associated with information for the in-loop processing DF 1128 and SAO 1130 are provided to Entropy Encoder 1134 for incorporation into the encoded video bitstream.

Figure 12:
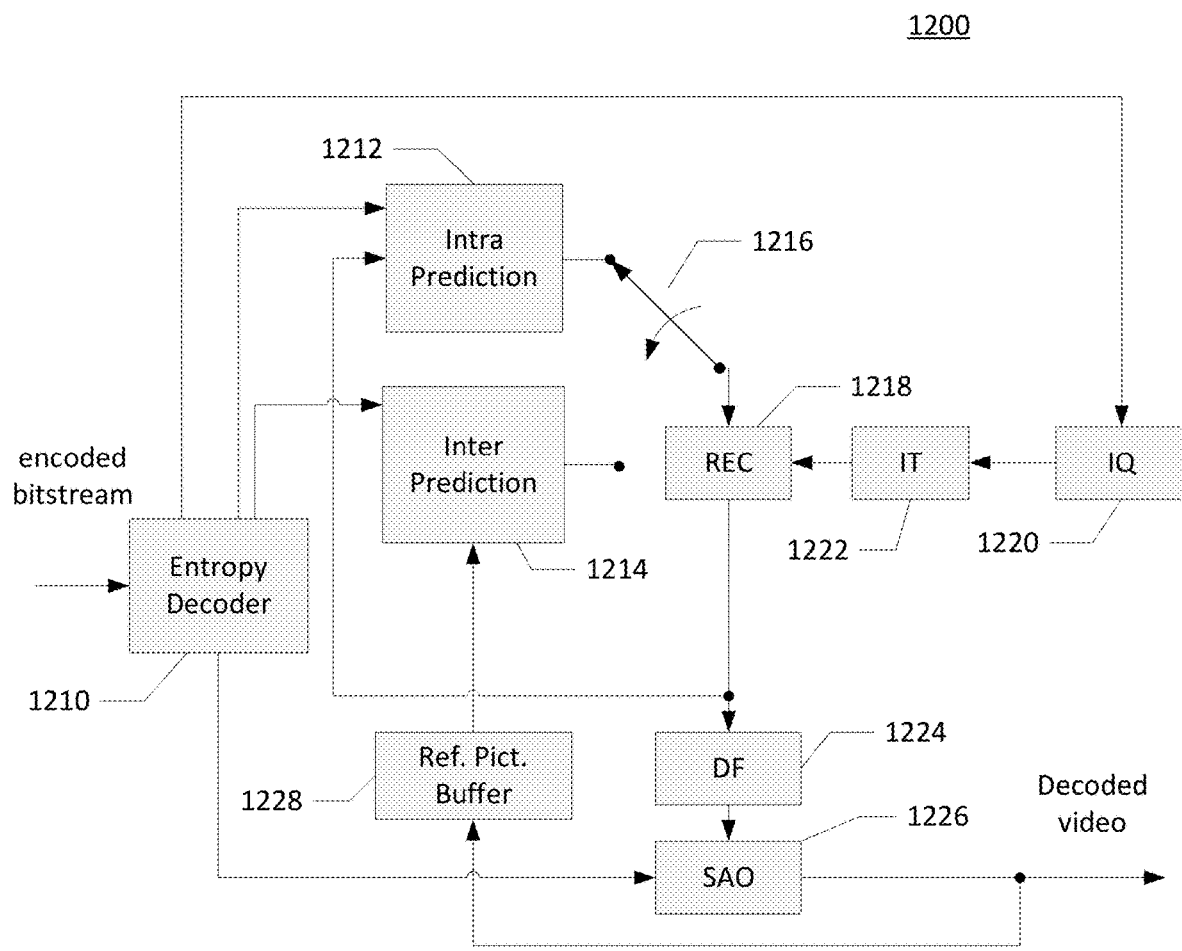
FIG. 12 illustrates an exemplary system block diagram for a video decoding system incorporating the intra prediction method according to embodiments of the present invention.

A corresponding Video Decoder 1200 for Video Encoder 110 of FIG. 11 is shown in FIG. 12. The encoded video bitstream is the input to Video Decoder 1200 and is decoded by Entropy Decoder 1210 to parse and recover the transformed and quantized residual signal and other system information. The decoding process of Decoder 1200 is similar to the reconstruction loop at Encoder 1100, except Decoder 1200 only requires motion compensation prediction in Inter Prediction 1214. Each block is decoded by either Intra Prediction 1212 or Inter Prediction 1214. Switch 1216 selects an intra predictor from Intra Prediction 1212 or Inter predictor from Inter Prediction 1214 according to decoded mode information. Intra Prediction 1212 decodes a current intra prediction mode according to an embodiment of the present invention. The transformed and quantized residual signal associated with each block is recovered by Inverse Quantization (IQ) 1220 and Inverse Transformation (IT) 1222. The recovered transformed and quantized residual signal is reconstructed by adding back the predictor in REC 1218 to produce reconstructed video. The reconstructed video is further processed by DF 1224 and SAO 1226 to generate final decoded video. If the currently decoded picture is a reference picture, the reconstructed video of the currently decoded picture is also stored in Ref. Pict. Buffer 1228 for later pictures in decoding order.

Various components of Video Encoder 1100 and Video Decoder 1200 in FIG. 11 and FIG. 12 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 1100 and Decoder 1200, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 11 and 12, Encoder 1100 and Decoder 1200 may be implemented in the same electronic device, so various functional components of Encoder 1100 and Decoder 1200 may be shared or reused if implemented in the same electronic device. For example, one or more of Reconstruction 1126, Inverse Transformation 1124, Inverse Quantization 1122, Deblocking Filter 1128, Sample Adaptive Offset 1130, and Reference Picture Buffer 1132 in FIG. 11 may also be used to function as Reconstruction 1218, Inverse Transformation 1222, Inverse Quantization 1220, Deblocking Filter 1224, Sample Adaptive Offset 1226, and Reference Picture Buffer 1228 in FIG. 12, respectively.

Embodiments of the intra prediction method for image or video coding system may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data by intra prediction in a video coding system, comprising:
receiving input data associated with a current block in a current picture, wherein the current block is a non-square block and is coded or to be coded by intra prediction, a maximum of a width and a height of the current block is a longer side of the current block, and a minimum of the width and the height of the current block is a shorter side of the current block;
determining a current intra prediction mode to derive an intra predictor for the current block based on the width, the height, or both of the current block, wherein the current intra prediction mode is selected from a current mode set comprising a first set of angular intra prediction modes for the longer side of the current block and the second set of angular intra prediction modes for the shorter side of the current block, wherein a number of the first set of the angular intra prediction modes is greater than a number of a second set of angular intra prediction modes for the shorter side of the current block; and
encoding or decoding the current block according to the current intra prediction mode.

2. The method of claim 1, wherein the first set of angular intra prediction modes is determined depending on a length of the longer side of the current block, and the second set of angular intra prediction modes is determined depending on a length of the shorter side of the current block.

3. The method of claim 1, wherein two or more thresholds are used to compare with the longer side or the shorter side of the current block for determining the first set of angular intra prediction modes for the longer side of the current block.

4. The method of claim 1, wherein the first set of angular intra prediction modes for the longer side of the current block is determined depending on a length of the longer side of the current block.

5. The method of claim 1, wherein the first set of angular intra prediction modes for the shorter side of the current block is determined depending on a length of the longer side of the current block.

6. The method of claim 1, wherein said encoding or decoding the current block according to the current intra prediction mode further comprises:
deriving most probable modes (MPMs) for the current block only if a number of intra prediction modes in the current mode set is greater than a threshold; and
if the number of intra prediction modes in the current mode set is greater than the threshold, the current intra prediction mode is coded using an MPM flag if the current intra prediction mode is equal to one of the MPMs or coded using fixed length coding if the current intra prediction mode is not equal to any of the MPMs.

7. The method of claim 6, wherein the current intra prediction mode is coded using fixed length coding, truncated binary coding, exponential-golomb coding, or variable length coding if the number of intra prediction modes in the current mode set is not greater than the threshold.

8. The method of claim 7, wherein the fixed length coding is applied to code the current intra prediction mode if the number of intra prediction modes in the current mode set is a power of two, and the variable length coding is applied to code the current intra prediction mode if the number of intra prediction modes in the current mode set is not a power of two.

9. The method of claim 1, wherein said encoding or decoding the current block according to the current intra prediction mode further comprises:
selecting a coding method for encoding or decoding the current intra prediction mode according to a number of intra prediction mode in the current mode set.

10. The method of claim 1, further comprising:
deriving a number of most probable modes (MPMs) in an MPM set from a number of intra prediction modes in the current mode set, wherein the number of MPMs in the MPM set varies with the number of intra prediction modes in the current mode set;
determining the MPMs for the current block; and
encoding or decoding the current intra prediction mode using an MPM flag if the current intra prediction mode is equal to one of the MPMs, and encoding or decoding the current intra prediction mode using fixed length coding if the current intra prediction mode is not equal to any of the MPMs.

11. The method of claim 10, wherein the number of MPMs in the MPM set is derived by deducting two to the power of n from the number of intra prediction modes in the current mode set, n is an integer greater than 1, and the number of intra prediction modes in the current mode set is greater than two to the power of n and is less than two to the power of n+1.

12. An apparatus of processing video data by intra prediction in a video coding system, the apparatus comprising one or more electronic circuits configured for:
receiving input data associated with a current block in a current picture, wherein the current block is a non-square block and is coded or to be coded by intra prediction, a maximum of a width and a height of the current block is a longer side of the current block, and a minimum of the width and the height of the current block is a shorter side of the current block;
determining a current intra prediction mode to derive an intra predictor for the current block based on the width, the height, or both of the current block, wherein the current intra prediction mode is selected from a current mode set comprising a first set of angular intra prediction modes for the longer side of the current block and the second set of angular intra prediction modes for the shorter side of the current block, wherein a number of the first set of the angular intra prediction modes is greater than a number of a second set of angular intra prediction modes for the shorter side of the current block; and
encoding or decoding the current block according to the current intra prediction mode.

* * * * *